US009436509B2

(12) United States Patent
McLean et al.

(10) Patent No.: US 9,436,509 B2
(45) Date of Patent: Sep. 6, 2016

(54) PRE-PROVISIONED WEB APPLICATION PLATFORM SITE COLLECTIONS

(75) Inventors: Michael McLean, Snoqualmie, WA (US); Smith Codio, Bellevue, WA (US); Jeffrey Wall, Sammamish, WA (US); Sonal Jain, Bothell, WA (US); Chythanya Vootkuri Krishna, Redmond, WA (US); Hui Zhu, Sunnyvale, CA (US); Michel Abraham, Bellevue, WA (US); Robert Kennedy Murugan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1110 days.

(21) Appl. No.: 13/325,482

(22) Filed: Dec. 14, 2011

(65) Prior Publication Data

US 2013/0159453 A1    Jun. 20, 2013

(51) Int. Cl.
*G06F 15/16* (2006.01)
*G06F 9/50* (2006.01)

(52) U.S. Cl.
CPC .................. *G06F 9/5072* (2013.01)

(58) Field of Classification Search
CPC . H04L 47/70; H04L 43/0876; H04L 43/045; H04L 41/0806; G06F 9/45533
USPC ......................................... 709/217, 223–225
See application file for complete search history.

(56) References Cited

U.S. PATENT DOCUMENTS

| | | | | |
|---|---|---|---|---|
| 7,577,722 | B1 * | 8/2009 | Khandekar | G06F 9/45558 709/220 |
| 2005/0262554 | A1 * | 11/2005 | Brooks | H04L 63/0263 726/11 |
| 2008/0275939 | A1 * | 11/2008 | Martin | G06F 8/61 709/203 |
| 2010/0042720 | A1 | 2/2010 | Stienhans et al. | |
| 2010/0306379 | A1 | 12/2010 | Ferris | |
| 2011/0145393 | A1 | 6/2011 | Ben-Zvi et al. | |
| 2011/0320605 | A1 * | 12/2011 | Kramer | H04L 41/0843 709/226 |
| 2012/0147894 | A1 * | 6/2012 | Mulligan | G06F 9/45533 370/395.53 |
| 2012/0265881 | A1 * | 10/2012 | Chen | H04L 12/12 709/226 |
| 2012/0311156 | A1 * | 12/2012 | DeJana | G06F 9/50 709/226 |
| 2013/0055239 | A1 * | 2/2013 | Anderson et al. | 718/1 |
| 2013/0055241 | A1 * | 2/2013 | De et al. | 718/1 |
| 2013/0139152 | A1 * | 5/2013 | Chang | G06F 9/45545 718/1 |
| 2013/0227097 | A1 * | 8/2013 | Yasuda | H04L 41/0813 709/222 |

OTHER PUBLICATIONS

"An Enterprise Private Cloud Architecture and Implementation Roadmap", In Intel Whitepaper, Jun. 2010, 12 pgs.
"Cisco and BMC Software Announce Strategic Alliance to Advance Cloud Computing", Retrieved on: Aug. 29, 2011, 11 pgs., Available at: http://finance.yahoo.com/news/Cisco-and-BMC-Software-iw-777437460.html?x=0&.v=1.

(Continued)

*Primary Examiner* — Duyen Doan
(74) *Attorney, Agent, or Firm* — Tom Wong; Julie Kane Akhter; Micky Minhas

(57) ABSTRACT

A pre-provisioned application platform may be provided. First, a plurality of parameters may be received. Then a plurality of pre-provisioned tenants may be created based upon the received plurality of parameters. A request for service may be received and then an actual tenant may be assigned to one of the plurality of pre-provisioned tenants in response to the received request.

20 Claims, 3 Drawing Sheets

(56) References Cited

OTHER PUBLICATIONS

"HP CloudSystem Matrix", Retrieved on: Aug. 29, 2011, 1 pg., Available at: http://h18010.www1.hp.com/products/blades/components/matrix/index.html.

"Red Hat Cloud Foundations", Retrieved on: Aug. 29, 2011, 12 pgs., Available at: http://www.redhat.com/f/pdf/cloud/101_whitepaper.pdf.

"IBM Smart Analytics Cloud", Published on: Sep. 2010, 364 pgs., Available at: http://www.redbooks.ibm.com/redbooks/pdfs/sg247873.pdf (NPL5a-5g).

* cited by examiner

PRE-PROVISIONED WEB APPLICATION PLATFORM SITE COLLECTIONS

BACKGROUND

Cloud computing provides computation, software, data access, and storage services that do not require end-user knowledge of the physical location and configuration of the system that delivers the services. Parallels to this concept can be drawn with the electricity grid, wherein end-users consume power without needing to understand the component devices or infrastructure required to provide the service.

Cloud computing describes a new supplement, consumption, and delivery model for IT services based on Internet protocols, and it typically involves provisioning of dynamically scalable and often virtualized resources. It is a byproduct and consequence of the ease-of-access to remote computing sites provided by the Internet. This may take the form of web-based tools or applications that users can access and use through a web browser as if the programs were installed locally on their own computers.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A pre-provisioned application platform may be provided. First, a plurality of parameters may be received. Then a plurality of pre-provisioned tenants may be created based upon the received plurality of parameters. A request for service may be received and then an actual tenant may be assigned to one of the plurality of pre-provisioned tenants in response to the received request.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
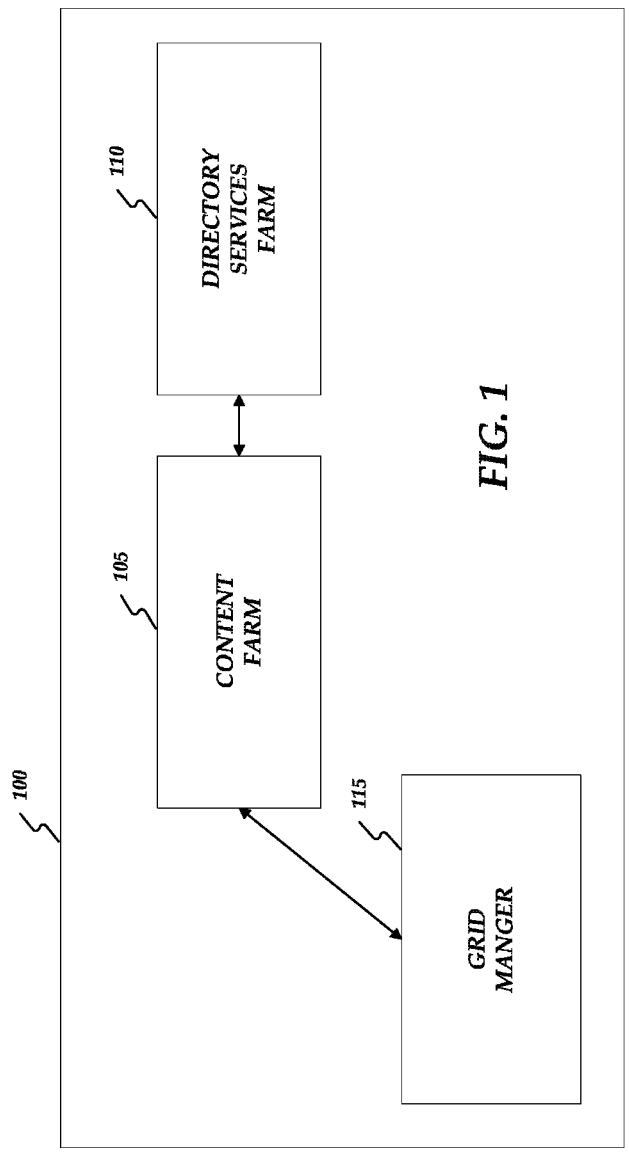
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Cloud computing systems may use web application platforms (e.g., SharePoint Online™) to support tenants and users corresponding to the tenants. As cloud computing systems continue to grow and service larger customers, web application platforms may need the ability to support provisioning thousands of tenants per hour, each completing within minutes. Consequently, this is a need for the ability to improve scaling tenants and users while providing a predictable user experience.

Rather than start an entire provisioning process from scratch for each tenant, embodiments of the invention may provide pre-provisioning that may create placeholder tenants that can be taken over at a later time. This pre-provisioning can be broken into two parts: i) a pre-provisioning scheduler job; and ii) a takeover process. The pre-provisioning scheduler job may run per network and may create a set number of pre-provisioned tenants based on several input parameters. The takeover process may occur when, for example, an actual tenant signs up for service (e.g., the web application platform). A pre-provisioned tenant may be selected from a pool and converted to an actual tenancy. A reassign job may be executed that handles the reassignment process. A pre-provisioned tenant may include the situation where many sites combine to form a "tenancy." In other words, a tenant may comprise one or more web components, which may include one or many sites.

Embodiments of the invention may improve both performance and scalability by completing the majority of provisioning work before the actual tenant arrives. For example, thousands of pre-provisioned tenants may be created during off peak hours. The aforementioned takeover process may be much quicker than initial provisioning from scratch, allowing a higher number of tenants to be provisioned at a much faster rate. Consequently, embodiments of the invention may include a system that can be used for: i) work that can be scheduled and completed prior to user demand; and ii) work that is performed on user demand that then customizes the prior output to be specific for a given user (or tenant). In other words, embodiments of the invention may do pre-work for distributing the load over time.

Since web application platform networks (e.g., SharePoint Online™ networks) may be deployed in a variety of geographic regions, the pre-provisioning scheduler job may be configured to run at various times throughout the day. The web application platform may also be available in multiple languages, so targets for tenant counts can be adjusted depending on languages required. The tenant counts can also be increased or decreased to handle spikes in demand (e.g., marketing events, performance tests, etc.).

FIG. 1 is a block diagram of an operating environment 100. Operating environment 100 may comprise, but is not limited to, a cloud computing system using a web application platform operated on the Internet. Operating environment 100 may comprise, for example, at least one content farm 105, at least one directory services farm 110, and a grid manager 115 connected together by a network. Directory services farm 110 may comprise, but is not limited to, a SharePoint Online™ directory services (SPODS) farm. While only one content farm and one directory services farm is shown in FIG. 1, operating system 100 may include any number of content farms and directory services farms.

The content farms shown in FIG. 1 may be used by a service center located in a particular geographic location to provide a working platform in a cloud computing environment. This working platform may provide, for example, an online document, management, and depository, used for collaboration between users within an organization (e.g., a tenant). These users may share documents and communicate with each other using the working platform.

Each farm may have a number of tenants. Also, consistent with embodiments of the invention, each farm may be pre-provisioned with pre-provisioned tenants awaiting assignment to new, actual tenants as described in greater detail below. A farm may comprise a collection of computer servers maintained to accomplish server needs beyond the capability of one machine. As will be described in greater detail below with respect to FIG. 3, a computing device 300 may comprise an operating environment for content farm 105, directory services farm 110, or grid manager 115.

Figure 2:
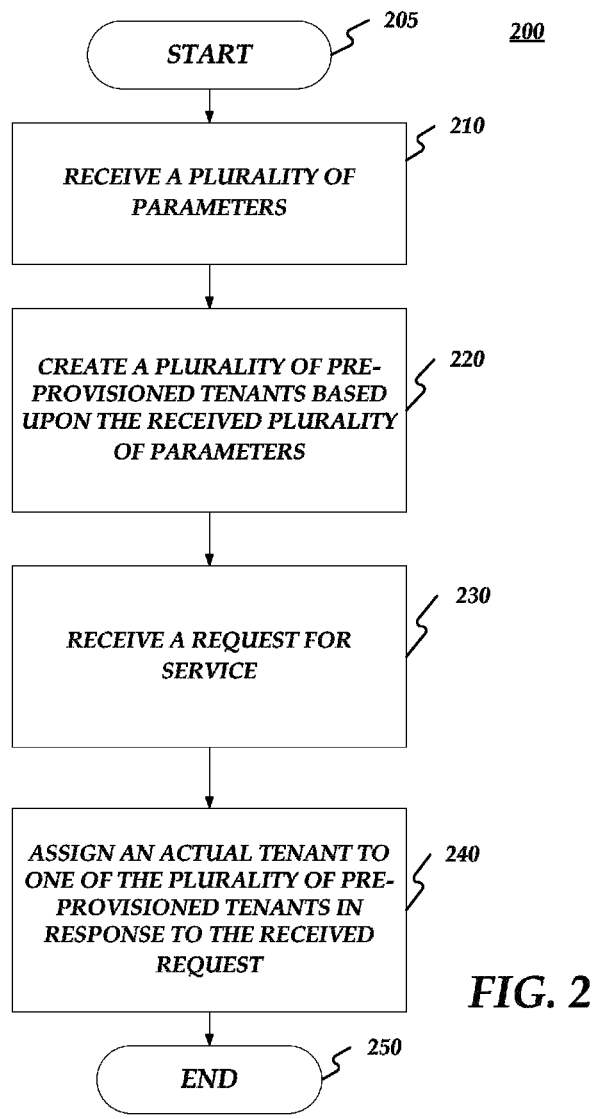
FIG. 2 is a flow chart of a method for providing a platform.

FIG. 2 is a flow chart setting forth the general stages involved in a method 200 consistent with an embodiment of the invention for providing a platform. Method 200 may be implemented using a computing device 300 (e.g., grid manager 115) as described in more detail below with respect to FIG. 3. Ways to implement the stages of method 200 will be described in greater detail below.

Method 200 may begin at starting block 205 and proceed to stage 210 where computing device 300 may receive a plurality of parameters. For example, rather than start the entire provisioning process from scratch for each new tenant, pre-provisioning may be implemented that may create placeholder tenants within environment 100 that can be taken over (e.g., assigned) at a later time. A pre-provisioning scheduler job may run, for example, to create a set number of pre-provisioned tenants based on the received plurality of parameters.

The plurality of parameters may comprise, but are not limited to: i) a feature pack indication; ii) a network indicator; iii) a target number of tenants; iv) a target number of tenants determined based upon anticipated demand; v) a target number of tenants per language; vi) a start time indicator; vi) a start time indicator corresponding to an off peak time period; vii) a stop time indicator; viii) a stop time indicator corresponding to an off peak time period; ix) a batch size indicator; x) a batch active wait time indicator; and xi) a batch idle wait time indicator. The feature pack indication may determine the feature pack of the tenants to be created (e.g., "Lite" or "Standard"). The network indicator may determine on which network the scheduler job will execute (e.g., "11"). The target number of tenants may indicate a maximum number pre-provisioned tenants to create. The target number of tenants may be adjusted up based on anticipated demand, for example, in response to a marketing campaign. Also, the target number of tenants may indicate a maximum number pre-provisioned tenants to create for a given language (e.g., 'en' 500). The start time indicator may determine the first hour of the day when pre-provisioning may run (e.g., 0-23) and may correspond to an off peak time period. The stop time indicator may determine the first hour of the day when pre-provisioning may run (e.g., 0-23) and may also correspond to an off peak time period. The batch size indicator may determine how many tenants to create in each batch (e.g., 5). The batch active wait time indicator may determine how many seconds to wait between launching new batches. And the batch idle wait time indicator may determine how many seconds to wait between checking to see if additional batches are needed.

From stage 210, where computing device 300 receives the plurality of parameters, method 200 may advance to stage 220 where computing device 300 may create a plurality of pre-provisioned tenants based upon the received plurality of parameters. For example, the pre-provisioning scheduler job may run to create the plurality of pre-provisioned tenants based on the received plurality of parameters. A sample command for starting the scheduler job follows:

New-GridJob—JobType "PreProvision"—JobData "—FeaturePack Lite—Network 11—BetweenHourStart 6—BetweenHourEnd 9—BatchSize 10—secondsActiveWait 60—secondsIdleWait 200—GoalCountPerLanguage @('en', 1000, 'es', 100, 'fr', 100, 'ja', 100, 'de', 100, 'it', 100, 'da', 100, 'nl', 50, 'fi', 50, 'no', 50, 'sv', 50, 'cs', 50, 'el', 50, 'hu', 50, 'pl', 50, 'ro', 50, 'pt-br', 50)"

Multiple pre-provisioned jobs can exist within a given network. Each job can support creating pre-provisioned tenants for multiple languages. The priority of the languages may be determined by the order in which they are listed when the command was created, and the languages can exist in any order. If BetweenHourEnd (e.g., stop time indicator) is reached and the goal counts have not been achieved, the job may stop creating pre-provisioned tenants until BetweenHourStart (e.g., start time indicator) is reached again.

Once computing device 300 creates the plurality of pre-provisioned tenants based upon the received plurality of parameters in stage 220, method 200 may continue to stage 230 where computing device 300 may receive a request for service. For example, a new, actual tenant (e.g., a company, an enterprise, an organization, etc.) may wish to receive working platform services (e.g., share, manage, and collaborate on documents). In this case, a user representing the new tenant may sign the new, actual tenant up for service by sending the request service.

After computing device 300 receives the request for service in stage 230, method 200 may proceed to stage 240 where computing device 300 may assign the actual tenant to one of the plurality of pre-provisioned tenants in response to the received request. For example, a takeover process may occur when, for example, the actual tenant signs up for service. In this case, a pre-provisioned tenant may be selected from a pool of pre-provisioned tenants (e.g., the plurality of pre-provisioned tenants) and converted to an actual tenancy. A reassign job may be executed that handles the takeover process.

When the new tenant signs up for service, the system may check to see if a pre-provisioned tenant exists based on requested criteria (network, feature pack, language, etc.) provided by the user who is signing the tenant up for service. If a pre-provisioned tenant is found within the plurality of pre-provisioned tenants, the takeover process may begin. If a new tenant signs up for service and no pre-provisioned tenants are available based on the requested criteria, the system may create an actual tenant from scratch and not use any pre-provided tenant. Once computing device 300 assigns the actual tenant in stage 240, method 200 may then end at stage 250.

An embodiment consistent with the invention may comprise a system for providing a platform. The system may comprise a memory storage and a processing unit coupled to the memory storage. The processing unit may be operative to receive a plurality of parameters and to create a plurality of pre-provisioned tenants based upon the received plurality of parameters. In addition, the processing unit may be operative to receive a request for service and to assign an actual tenant to one of the plurality of pre-provisioned tenants in response to the received request.

Another embodiment consistent with the invention may comprise a system for providing a platform. The system may comprise a memory storage and a processing unit coupled to the memory storage. The processing unit may be operative to create a plurality of pre-provisioned tenants based upon a plurality of parameters during an off peak time for a region a data center corresponding to the plurality of pre-provisioned tenants. Furthermore, the processing unit may be operative to receive a request for service and to assign an actual tenant to one of the plurality of pre-provisioned tenants in response to the received request.

Yet another embodiment consistent with the invention may comprise a system for providing a platform. The system may comprise a memory storage and a processing unit coupled to the memory storage. The processing unit may be operative to receive a plurality of parameters and to create a plurality of pre-provisioned tenants based upon the received plurality of parameters. Also, the processing unit may be operative to assign an actual tenant to one of the plurality of pre-provisioned tenants in response to a received request from a user corresponding to the actual tenant.

Figure 3:
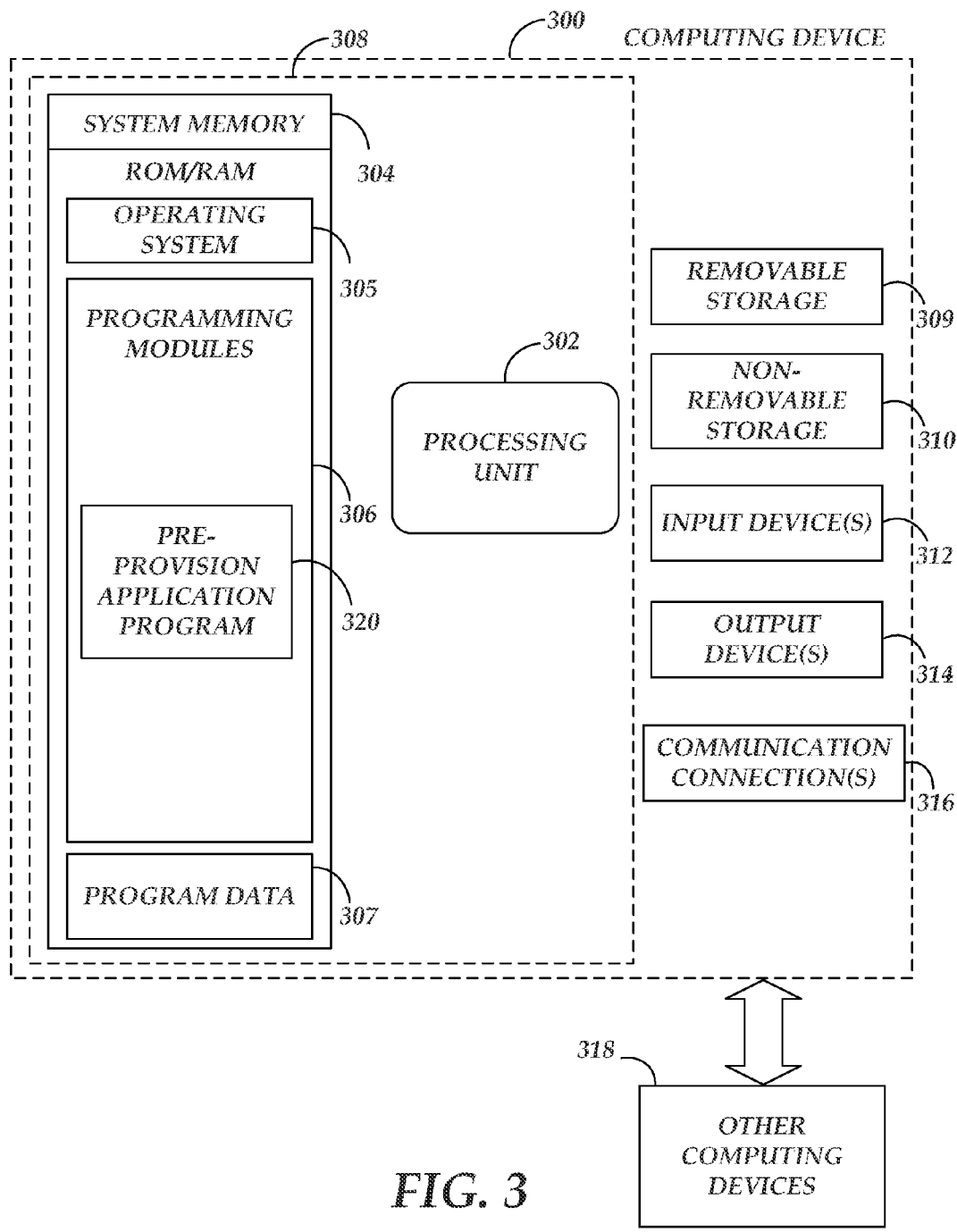
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for content farm 105, directory services farm 110, or a grid manager 115. Content farm 105, directory services farm 110, or a grid manager 115 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g., random access memory (RAM)), non-volatile (e.g., read-only memory (ROM)), flash memory, or any combination. System memory 304 may include operating system 305, one or more programming modules 306, and may include a program data 307. Program data 307 may comprise the grid manager database when computing device 300 comprises grid manger 115. Operating system 305, for example, may be suitable for controlling computing device 300's operation. In one embodiment, programming modules 306 may include pre-provision application program 320. Pre-provision application program 320 may comprise the provisioning monitoring job when computing device 300 comprises grid manager 115. In addition, pre-provision application program 320 may comprise the content farm monitoring job when computing device 300 comprises content farm 105. And pre-provision application program 320 may comprise the directory services farm monitoring job when computing device 300 comprises directory services farm 110. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow computing device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., pre-provision application program 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the invention, may be performed via application-specific logic integrated with other components of computing device 300 on the single integrated circuit (chip).

Computing device 300 may be coupled to a camera that may be operative to record a user and capture motions and/or gestures made by the user. Computing device 300 may be further operative to capture words spoken by the user, such as by a microphone, and/or capture other inputs from the user such as by a keyboard and/or mouse (not pictured). Consistent with embodiments of the invention, the camera may comprise any motion detection device capable of detecting the movement of the user. For example, the camera may comprise a Microsoft® Kinect® motion capture device comprising a plurality of cameras and a plurality of microphones.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a platform, the method comprising:

receiving a plurality of parameters, wherein the plurality of parameters includes a network indicator specifying a particular network and a plurality of language indicators, wherein each language indicator specifies a different language and is prioritized based on an order of the language indicator within the plurality of language indicators;

creating a plurality of pre-provisioned tenants based upon the received plurality of parameters, wherein at least one pre-provisioned tenant is created on the particular network;

receiving a request for service, the request including criteria for an actual tenant; and assigning the actual tenant to the at least one pre-provisioned tenant of the plurality of pre-provisioned tenants in response to the received request, wherein assigning the actual tenant includes matching the criteria in the request to parameters of the at least one pre-provisioned tenant of the plurality of pre-provisioned tenants, wherein the criteria in the request includes at least the particular network.

2. The method of claim 1, wherein receiving the plurality of parameters comprises receiving the plurality of parameters comprising a feature pack indication.

3. The method of claim 1, wherein receiving the plurality of parameters comprises receiving the plurality of parameters comprising a target number of tenants.

4. The method of claim 1, wherein receiving the plurality of parameters comprises receiving the plurality of parameters comprising a target number of tenants determined based upon anticipated demand.

5. The method of claim 1, wherein receiving the plurality of parameters comprises receiving the plurality of parameters comprising a target number of tenants assigned to each language indicator.

6. The method of claim 1, wherein receiving the plurality of parameters comprises receiving the plurality of parameters comprising a start time indicator.

7. The method of claim 1, wherein receiving the plurality of parameters comprises receiving the plurality of parameters comprising a start time indicator corresponding to an off peak time period.

8. The method of claim 1, wherein receiving the plurality of parameters comprises receiving the plurality of parameters comprising a stop time indicator.

9. The method of claim 1, wherein receiving the plurality of parameters comprises receiving the plurality of parameters comprising a stop time indicator corresponding to an off peak time period.

10. The method of claim 1, wherein receiving the plurality of parameters comprises receiving the plurality of parameters comprising a batch size indicator.

11. The method of claim 1, wherein receiving the plurality of parameters comprises receiving the plurality of parameters comprising a batch active wait time indicator.

12. The method of claim 1, wherein receiving the plurality of parameters comprises receiving the plurality of parameters comprising a batch idle wait time indicator.

13. The method of claim 1, wherein creating the plurality of pre-provisioned tenants based upon the received plurality of parameters comprises creating the plurality of pre-provisioned tenants during an off peak time.

14. The method of claim 1, wherein creating the plurality of pre-provisioned tenants based upon the received plurality of parameters comprises creating the plurality of pre-provisioned tenants during an off peak time for a region data center corresponding to the plurality of pre-provisioned tenants.

15. The method of claim 1, wherein creating the plurality of pre-provisioned tenants based upon the received plurality of parameters comprises running a scheduler job on a grid manager.

16. The method of claim 1, wherein receiving the request for service comprises receiving the request for service from a user corresponding to the actual tenant.

17. A system for providing a platform, the system comprising:

a memory storage; and a processing unit coupled to the memory storage, wherein the processing unit is operative to:

receive a plurality of parameters, wherein the plurality of parameters includes a network indicator specifying a particular network and a plurality of language indicators, wherein each language indicator specifies a different language and is prioritized based on an order of the language indicator within the plurality of language indicators;

create a plurality of pre-provisioned tenants based upon the plurality of parameters, wherein the plurality of pre-provisioned tenants are created during an off peak time for a region data center corresponding to the plurality of pre-provisioned tenants, and wherein at least one pre-provisioned tenant of the plurality of pre-provisioned tenants is created on the particular network;

receive a request for service, the request including criteria for an actual tenant; and assign the actual tenant to the at least one pre-provisioned tenant of the plurality of pre-provisioned tenants in response to the received request, wherein assigning the actual tenant includes matching the criteria in the request to parameters of the at least one pre-provisioned tenant of the plurality of pre-provisioned tenants, and wherein the criteria in the request includes at least the particular network.

18. A computer-readable storage device that stores a set of instructions which when executed perform a method for providing a platform, the method executed by the set of instructions comprising:

receiving a plurality of parameters, wherein the plurality of parameters includes a network indicator specifying a particular network and a plurality of language indicators, wherein each language indicator specifies a different language and is prioritized based on an order of the language indicator within the plurality of language indicators;

creating a plurality of pre-provisioned tenants based upon the received plurality of parameters, wherein at least one pre-provisioned tenant is created on the particular network; and assigning an actual tenant to the at least one pre-provisioned tenant of the plurality of pre-provisioned tenants in response to a received request from a user corresponding to the actual tenant, the request including criteria for the actual tenant, wherein assigning the actual tenant includes matching the criteria in the request to parameters of the at least one pre-provisioned tenant of the plurality of pre-provisioned tenants, and wherein the criteria in the request includes at least the particular network.

19. The computer-readable storage device of claim 18, wherein creating the plurality of pre-provisioned tenants based upon the received plurality of parameters comprises creating the plurality of pre-provisioned tenants during an off peak time for a region data center corresponding to the plurality of pre-provisioned tenants.

20. The system of claim 17, wherein the plurality of parameters comprises a target number of tenants assigned to each language indicator.

\* \* \* \* \*